United States Patent
Schmidt

(10) Patent No.: US 7,375,438 B2
(45) Date of Patent: May 20, 2008

(54) METHOD AND DEVICE FOR CONTROLLING A ROLL-BACK PREVENTION SYSTEM

(75) Inventor: Mario Schmidt, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 10/532,784

(22) PCT Filed: Jun. 23, 2003

(86) PCT No.: PCT/DE03/02085

§ 371 (c)(1),
(2), (4) Date: Dec. 12, 2005

(87) PCT Pub. No.: WO2004/039647

PCT Pub. Date: May 13, 2004

(65) Prior Publication Data
US 2006/0129299 A1    Jun. 15, 2006

(30) Foreign Application Priority Data
Oct. 24, 2002    (DE) ................................. 102 49 463

(51) Int. Cl.
*B60L 1/00*    (2006.01)

(52) U.S. Cl. ...................................................... 307/9.1
(58) Field of Classification Search .................. 307/9.1
See application file for complete search history.

(56) References Cited

U.S. PATENT DOCUMENTS

2005/0075775 A1 *    4/2005    Carlson et al. ............... 701/51

FOREIGN PATENT DOCUMENTS

| DE | 195 25 552 | 1/1997 |
| EP | 0 251 156 | 1/1988 |
| EP | 0 749 876 | 12/1996 |
| WO | 01 58714 | 8/2001 |

* cited by examiner

*Primary Examiner*—Robeert L. Deberadinis
(74) *Attorney, Agent, or Firm*—Kenyon & Kenyon LLP

(57) ABSTRACT

A method and an apparatus for controlling a roll-back prevention device, in which the existence of an open vehicle door is detected and a stationary state of the vehicle is detected. In the present invention, if there is an open vehicle door at the time when a stationary state of the vehicle commences or during a stationary state of the vehicle, the roll-back prevention device will not be activated.

7 Claims, 1 Drawing Sheet

METHOD AND DEVICE FOR CONTROLLING A ROLL-BACK PREVENTION SYSTEM

FIELD OF THE INVENTION

The present invention is based on a method and an apparatus for controlling a roll-back prevention device.

BACKGROUND INFORMATION

A method and an arrangement for holding a vehicle on an inclined roadway are known from German Published Patent Application No. 195 25 552. In that case, vehicle speed, brake pedal actuation, starting torque, operating state of the vehicle engine, actuation of a parking brake and activation of a holding system are determined. If the holding system has been activated and the speed of the vehicle is below a limit value, the brake force or the brake pressure will be maintained when the brake pedal is actuated and no starting torque is sensed. The brake force is increased when, with the engine switched off, neither the brake pedal nor the parking brake is actuated or when, with the engine switched on, neither actuation of the brake pedal nor a starting torque is detected. The brake force is reduced when, with the engine switched off and the brake pedal not actuated, the parking brake is applied or when, with the engine switched on, a starting torque is sensed. A warning signal can be triggered using a door contact and/or a seat contact.

The features in the preambles of the independent claims are taken from German Published Patent Application No. 195 25 552.

SUMMARY OF THE INVENTION

The present invention is based on a method for controlling a roll-back prevention device, in which
the existence of an open vehicle door is detected and
a stationary state of the vehicle is detected.
The core of the invention resides in the fact that
if there is an open vehicle door at the time when a stationary state of the vehicle commences or during a stationary state of the vehicle (i.e. if the door is open or is opened at the time when a stationary state of the vehicle commences or during a stationary state of the vehicle), the roll-back prevention device will not be activated.

During parking maneuvers, for example, the driver's door is often opened slightly to enable the driver to have a better view of the roadway. The present invention advantageously prevents the hill holder from being erroneously activated after a parking maneuver has been carried out with the driver's door open (vehicle then stationary). With an activated hill holder, there would be a risk of the driver leaving the vehicle (believing that the vehicle will remain at a standstill) and of the vehicle suddenly starting to move, without the driver, after the holding time of the hill holder had elapsed (if the vehicle had been parked on a surface that slopes in the longitudinal direction of the vehicle).

The expression "stationary state of the vehicle" is to be understood in a broad sense. An "exactly" stationary state of the vehicle, in which the speed v of the vehicle is mathematically exactly zero, is not detectable. For that reason, the expression "stationary state of the vehicle" is to be construed as meaning that the longitudinal speed of the vehicle is less than a very low limit speed. This can also be expressed as there being a "substantially stationary state of the vehicle".

Accordingly, the method according to the present invention is a method for preventing activation of a roll-back prevention device.

The expression "roll-back prevention device" is to be understood as meaning a hill holder which is intended to prevent a vehicle from rolling back on a hill when starting, i.e. to prevent a vehicle from rolling away in the downhill direction.

According to one advantageous embodiment, therefore, a stationary state of the vehicle is detected if the longitudinal speed of the vehicle falls below a predeterminable, very small limit value.

According to one advantageous embodiment, the open vehicle door is the driver's door.

According to another advantageous embodiment, an open door is detected by a door contact switch. A door contact switch is present in almost all vehicles. Thus, the present invention can advantageously be implemented without significant additional expenditure.

The apparatus for controlling, or rather preventing the activation of, a roll-back prevention device includes
door status detection means for detection of an open vehicle door and
stationary state detection means for detection of a stationary state of the vehicle.
The advantageous core of the apparatus resides in the fact that
activation prevention means are also present which prevent activation of the roll-back prevention device if an open vehicle door is detected at the time when a stationary state of the vehicle commences.

According to one advantageous embodiment, the door status detection means detect the status of the driver's door.

According to another advantageous embodiment, the door status detection means are in the form of a door contact switch.

DETAILED DESCRIPTION

Hill Hold Control (also referred to as HHC or as "hill-holder") is a system that frees the driver from operating the handbrake when pulling away. By maintaining ("locking") the brake pressure applied by the driver, HHC prevents the vehicle from rolling back as the brake pedal is released before pulling-away actually takes place. The brake pressure is locked for the duration of a fixed or variable holding time of the HHC system. To enable the driver to switch comfortably from brake pedal to accelerator pedal, the selected holding time (i.e. locked period) of the brake pressure cannot be of an arbitrarily short duration. Consequently, it may be possible for the driver to leave the vehicle during the holding time. If the brake pressure is then released (after the driver has left the vehicle), the vehicle is able to roll away without the driver.

In vehicles having manually shifted transmissions, the presence of the driver during the pulling-away process can be verified by a clutch switch. In vehicles having automated manually-shifted transmissions, automatic transmissions or CVT transmissions (=continuously variable automatic transmissions), however, that is not possible.

To prevent the vehicle from being left by the driver while the HHC function remains activated, there is the possibility of evaluating the contact switch of the driver's door (or rather the position of the contact switch of the driver's door). Furthermore, by evaluating the contact switch of the driver's door it is possible to extend the holding time of the HHC system. It must, however, be ensured in that case that the driver cannot leave the vehicle during that period by another route (e.g. through the passenger door or another door, a window, an open roof, . . . ).

Possible forms of evaluation of the contact switch of the driver's door may be:
- not activating HHC if the driver's door is open even if all the other conditions for activation of HHC are met;
- when the HHC function is already activated, stopping HHC if the driver's door is opened and the foot brake is not being applied.

Besides evaluation of the contact switch of the driver's door, it is also possible for the passenger door contact switch to be evaluated in addition.

Figure 1:
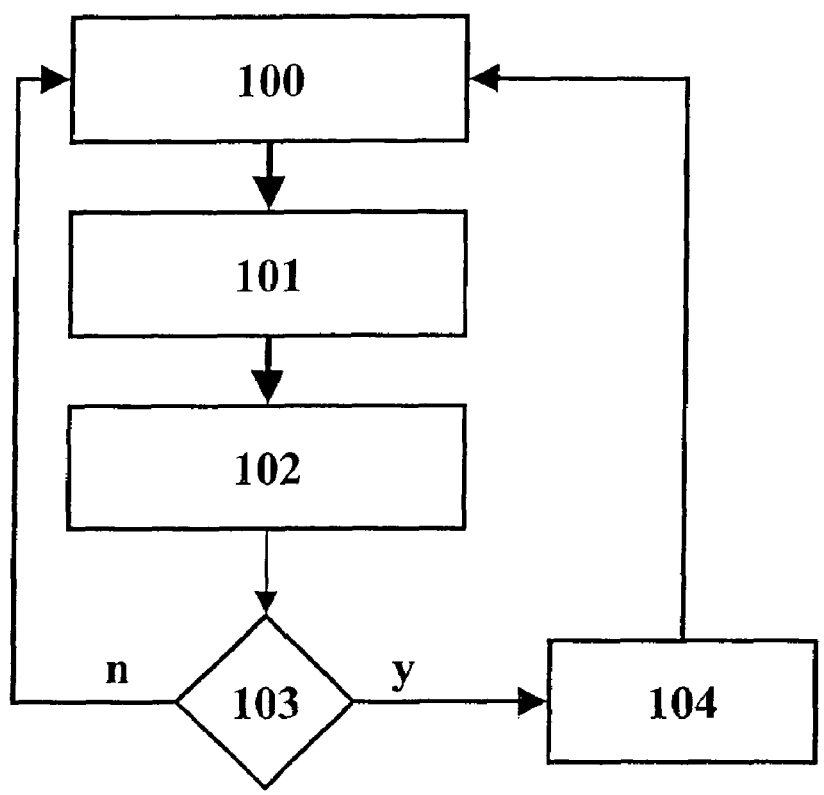
FIG. 1 shows a flow chart of the method according to the invention.

The manner in which the method according to the invention proceeds is illustrated in FIG. 1. The start of the method is in block 100. Then, in block 101, the existence of an open driver's door is detected. Thereafter, in block 102, a stationary state of the vehicle is detected. It is then examined in block 103 whether an open vehicle door already existed at the time when the stationary state of the vehicle commenced. Alternatively, it is also possible to examine in a stationary vehicle whether there is an open vehicle door. If the decision is "yes" (shown as "y" in FIG. 1), then activation of the roll-back prevention device is prevented in block 104. If, on the other hand, the answer in block 103 is "no" (shown as "n" in FIG. 1), then the method returns to the start in block 100 and activation of the roll-back prevention device is not prevented.

Figure 2:
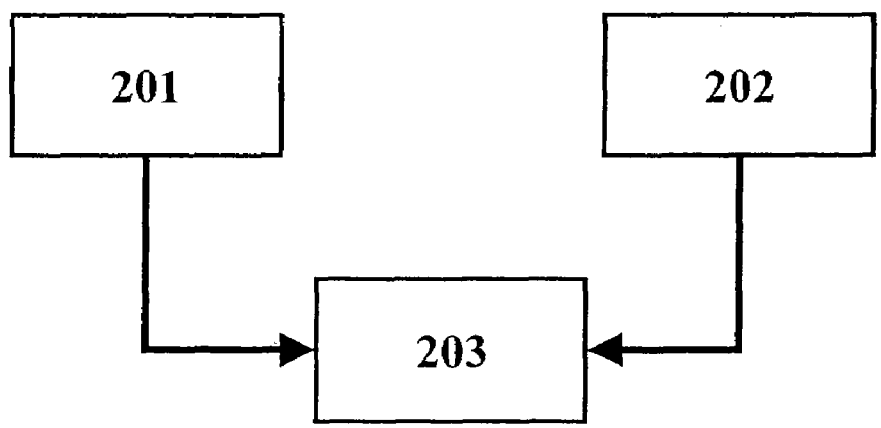
FIG. 2 shows the layout of the apparatus according to the invention.

The layout of the apparatus according to the present invention is illustrated in FIG. 2, in which
- block 201 includes door status detection means for detection of an open vehicle door and
- block 202 includes stationary state detection means for detection of a stationary state of the vehicle.

The output signals of blocks 201 and 202 are fed to block 203. Block 203 includes activation prevention means which prevent activation of the roll-back prevention device in the event of a vehicle door being detected as being open at the time when the stationary state of the vehicle commences (or during the stationary state of the vehicle).

What is claimed is:

1. A method for controlling a roll-back prevention device, comprising:
   detecting an existence of an open vehicle door;
   detecting a stationary state of a vehicle; and
   if an open vehicle door is present one of when the stationary state of the vehicle commences and during the stationary state of the vehicle, preventing an activation of the roll-back prevention.

2. The method as recited in claim 1, wherein the open vehicle door is a door of a driver.

3. The method as recited in claim 1, wherein:
   the detecting of the open vehicle door is by a door contact switch.

4. The method as recited in claim 1, wherein:
   the stationary state of the vehicle is detected if a longitudinal speed of the vehicle falls below a predeterminable limit value.

5. An apparatus for controlling a roll-back prevention device, comprising:
   an arrangement for detecting an existence of an open vehicle door;
   an arrangement for detecting a stationary state of a vehicle; and
   an arrangement for, if an open vehicle door is present one of when the stationary state of the vehicle commences and during the stationary state of the vehicle, preventing an activation of the roll-back prevention.

6. The apparatus as recited in claim 5, wherein:
   the arrangement for detecting the existence of the open vehicle door detects a status of a door of a driver.

7. The apparatus as recited in claim 5, wherein:
   the arrangement for detecting the existence of the open vehicle door includes a door contact switch.

* * * * *